United States Patent
Jensen

(10) Patent No.: US 6,545,633 B1
(45) Date of Patent: Apr. 8, 2003

(54) RADAR SYSTEM HAVING SIMULTANEOUS MONOSTATIC AND BISTATIC MODE OF OPERATION

(75) Inventor: Eric B. Jensen, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/117,123

(22) Filed: Apr. 8, 2002

(51) Int. Cl.⁷ .............................................. G01S 13/00
(52) U.S. Cl. .......................... 342/59; 342/27; 342/118; 342/134
(58) Field of Search .............................. 342/27, 28, 59, 342/175–186, 195, 196, 197, 74–81, 94–103, 118, 134, 135–145, 159–174, 104–115, 120–123, 125, 128, 129–133, 147

(56) References Cited

U.S. PATENT DOCUMENTS 4,318,102 A  *  3/1982  Poirier ........................ 342/27

5,113,193 A  *  5/1992  Powell et al. .................. 342/25

FOREIGN PATENT DOCUMENTS

| DE | 3501952 C1 | * | 3/1991 | ........... G01S/13/42 |
| EP | 1045258 A2 | * | 10/2000 | ........... G01S/13/93 |
| GB | 2134740 A | * | 8/1984 | ............. G01S/7/02 |

* cited by examiner

Primary Examiner—Bernarr E. Gregory
(74) Attorney, Agent, or Firm—Fitch, Even, Tabin & Flannery

(57) ABSTRACT

A pulse doppler radar system simultaneously operating monostatically and bistatically. A pair of radar unit operate monostatically transmitting a radio frequency (RF) energy signal and receiving a RF return from the RF energy signal. In addition, simultaneously, one unit operates as a receiver receiving a bistatic return from the other. Information from the bistatic return is combined with information from monostatic returns to locate individual targets.

11 Claims, 6 Drawing Sheets

RADAR SYSTEM HAVING SIMULTANEOUS MONOSTATIC AND BISTATIC MODE OF OPERATION

BACKGROUND OF THE INVENTION

1. Field of the Invention

The present invention is related to pulse doppler radar for detecting, precisely locating and tracking moving objects including airborne and spaceborne objects and, more particularly, to airborne or spaceborne pulse doppler radar for detecting, precisely locating and tracking moving objects on the ground.

2. Background Description

A monostatic radar system has its transmitter and receiver at the same location. A bistatic radar has a transmitter at one location and a receiver at a different, most often, distant location. Regardless of whether a radar system is monostatic or bistatic, when a target is detected using a single radar sensor, the target's positional range (distance from the sensor) is highly accurate. However, the target's cross-range (also known as its azimuthal position or sometimes, doppler direction) is much less accurate. Thus, a target's distance is always known to a much greater degree of certainty than the target's actual position. Coarser, azimuthal accuracy is due largely to radar beam spreading, which occurs in the beam both from the radar transmitter to the target and from the target to the sensor, i.e., the receiver.

Typically for a moving target, azimuthal position uncertainty is between ¼ to ⅒ of the beam width and depends upon the relative strength of the radar target's return signal. Invariably, this azimuthal position uncertainty is much larger than the range or down-range positional uncertainty and, almost invariably, much larger than the desired level of uncertainty. Accordingly, the actual position of a target on the ground lies within an elliptically shaped area or on a spheroid that is identified by the positional inaccuracies, i.e., the azimuthal uncertainty distance defining major axis and the range uncertainty defining the minor axis.

For example, an airborne ground-moving-target surveillance radar at a standoff distances of 100 miles with a nominal pulse width of 200 MHz has a range positional uncertainty of approximately 1 meter. By contrast, the azimuthal or cross-range positional uncertainty may be tens of meters. Further, this azimuthal positional uncertainty is even more exaggerated for space based radar. The range positional uncertainty for the single detection of a moving target from a "typical" feasible space based radar is at least as good as airborne radar, i.e., as little as 1 meter or better. However, the azimuthal position uncertainty for space based radar may be on the order of hundreds of meters and even a few kilometers.

Operating two radar systems simultaneously at platforms positioned at different angles with respect to the target improves azimuthal positional accuracy. Radar sensors detect targets with a position-error ellipse with a high degree of ellipticity, i.e., the ratio of major axis to minor axis is hundreds to one or even a thousand or more to one because of the previously stated disparity in accuracy between range measurements and cross-range measurements. Thus, even a small difference in viewing angle of a moving target from two radar sensor platforms drastically reduces the target's position uncertainty. For example, at best case where the two systems' sensors are at a right angle to each other with respect to the target, the target's positional uncertainty within in the plane defined by the target and the two platforms is bounded by the range positional uncertainty for the target from either sensor. Thus, the dual sensor target positional uncertainty is dramatically reduced as a result of combining the range position information from both sensors over that of independent sensors acting alone.

However, it is well known that difficulties arise even using two radar sensors. It is especially difficult to locate and track one target when the target density of moving targets in an area being surveilled exceeds or becomes comparable to the major axis dimension (azimuthal dimension) of a single sensor error ellipse. When this occurs, multiple targets occur at nearly the same range from each sensor, causing target error ellipses from one sensor to overlap target error ellipses from the other sensor at multiple locations. This makes accurately locating and tracking targets much more difficult. While some of these overlapping error ellipses correspond to true target locations, some overlapping occurs from other different targets. This second type of overlap can result in a false target or a "ghost" and is typically referred to as a multi-lateration problem. It is difficult to discriminate between a true targets and ghosts under these conditions.

These large cross range positional errors are vexations to current radar systems as well as multi-target indication surveillance systems currently being developed, whether they are intended as airborne or spaceborne radar systems. Ideally, targets of interest are tracked for as long as tens of minutes. Unfortunately, with cross range errors that may be as much as tens or hundreds of meters or even kilometers, even using bistatic radar this tracking capability is not generally possible, especially where the target of interest is near other moving objects, e.g., a truck on a busy road. Additionally, radar surveillance systems for weapons delivery platforms must be able to make a very precise handoff to, for example, a manned aircraft or even a GPS guided weapon. This precision is not available with current state-of-the-art airborne target surveillance radars, much less for spaceborne moving target surveillance radars.

Thus, there is a need for a way to resolve target position ambiguities or ghosts in pulse doppler radar systems. There is a further need for a radar system that can track individual moving targets in close proximity to each other.

SUMMARY OF THE INVENTION

It is a purpose of the invention to improve radar system positional accuracy;

It is another purpose of the invention to track moving targets in close proximity to each other;

It is another purpose of the invention to resolve target position ambiguities (ghosts) in two sensor multi-lateration that can occur in pulse doppler radars especially at high moving target density.

The present invention is a pulse doppler radar system simultaneously operating monostatically and bistatically. A pair of radar units operate monostatically transmitting a radio frequency (RF) energy signal and receiving a RF return from the transmitted RF energy signal. In addition, simultaneously, one radar unit receives a bistatic return from the other unit. Information from the bistatic return is combined with information from both monostatic returns to locate individual targets.

In particular, for airborne or spaceborne pulse doppler radar, the present invention may be used for detecting, precisely locating, and tracking moving ground based objects. Further, the present invention has application to pulse doppler radar regardless of source/sensor location, used for detecting, precisely locating and tracking moving objects at any location, including, for example, ground, airborne and spaceborne objects.

BRIEF DESCRIPTION OF THE DRAWINGS

The present invention is illustrated by way of example and not limitation the accompanying figures in which like references indicate similar elements and which.

DESCRIPTION OF PREFERRED EMBODIMENTS

In a first preferred embodiment, two independent airborne or spaceborne radar sensors operate monostatically and bistatically, simultaneously, to surveil for moving targets that are constrained to travel on the ground and for known sensor locations and altitudes with respect to the ground. In a second preferred embodiment, two independent sensors (ground-based, airborne, or spaceborne) surveil for moving targets that are not constrained to travel over a known surface position such as the ground and, wherein the moving targets may be airborne or spaceborne.

Figure 1:
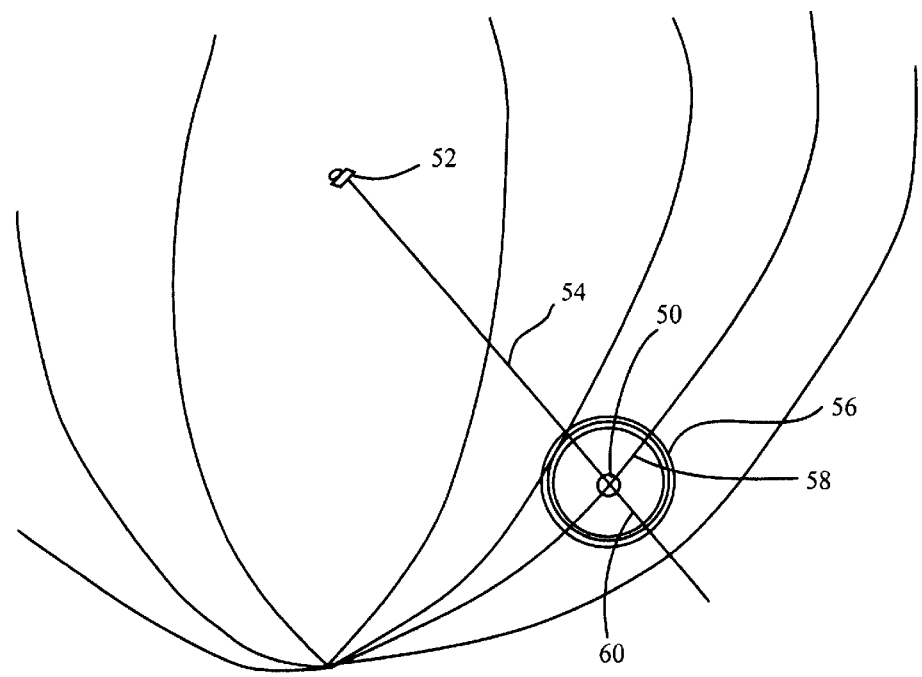
FIG. 1 shows a basic example of geometry in locating objects detected by a single pulse doppler radar.

FIG. 1 shows a basic example of geometry in locating objects detected by a single pulse doppler radar. In this example, a target 50 is detected by a single radar sensor 52. The most accurately determinable target's position coordinate is the target's range from the sensor 52 represented by ray 54. For a particular range 54, the target 50 may be treated as lying within a spherical shell 56. The thickness of the shell 56 is equal to the uncertainty of object's measured range 54 from the sensor 52. In the other two coordinates (58, 60) orthogonal to the range direction and on the surface of the shell 56, the object's position is determinable to a much lower degree of accuracy, i.e., typically ¼ to ⅒ of the size of the antenna beam.

For any detected object in each of the three axes, the location and shape of the volume of space (positional locus) than encloses the object's likely position may be calculated. For most radar designs, the shape of this positional locus is nearly ellipsoidal, with one axis, i.e., the range direction, much shorter than the other two axes. The shape of the positional locus is not exactly ellipsoidal because it lies on the surface of the constant range sphere. Also, in the cross-range directions, i.e., on the sphere surface, shape depends on the shape and design of the radar antenna. However, for most normal radars, as well as for the purpose of description of the invention description, the positional locus is approximated as an ellipsoid. So, for brevity and simplicity, the positional locus in three dimensions for a detected object is referred to herein as the object's "detection error ellipsoid" or "error ellipsoid."

Figure 2:
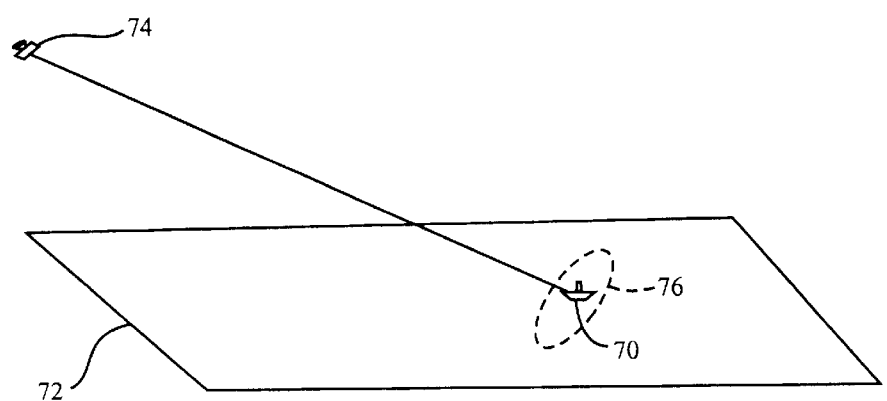
FIG. 2 shows an example of a ground based object, i.e., moving on the ground in two dimensions, detected by space based or airborne radar unit.

FIG. 2 shows an example of where the object 70 is a ground based object, i.e., on the ground, operating in two dimensions detected by space based radar unit 74. The object's position on the ground is defined by the intersection of the detection error ellipsoid 76 and the ground plane 72. This two-dimensional locus 76 is also referred to herein as the object's "detection error ellipse" or "error ellipse."

Figure 3:
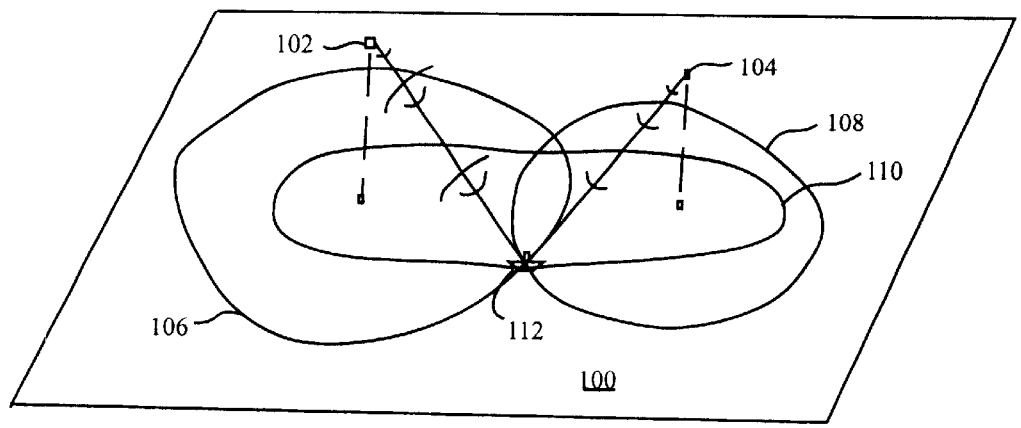
FIG. 3 shows a preferred embodiment pulse doppler radar system wherein two independent radar units are positioned separate from each other and simultaneously operating both independently and cooperatively.

FIG. 3 shows a first preferred embodiment pulse doppler radar system 100 wherein two independent radar units 102, 104 are positioned separate from each other and simultaneously operating both independently and cooperatively. Each independent radar unit 102, 104 operates monostatically, transmitting a radio frequency (RF) energy pulse and receiving a return signal from the transmitted RF pulse. The monostatic return signal indicates a range from the particular radar unit 102, 104 of any target in the transmission path. In addition, the two radar units 102, 104 are operating simultaneously bistatically, one operating as a transmitter (e.g., 102) and the other operating as a receiver (104). In this embodiment, the radar units are surveilling ground targets, such as those of FIG. 2.

Each radar unit 102, 104 has a corresponding monostatic isorange locus 106, 108, respectively. In the bistatic operation the target range dimension corresponds to the sum of range vectors from the target to the transmitter and to the receiver. Thus, for the bistatic operation the isorange locus 110 is spheroidal with the transmitter 102 and receiver 104 locating the two foci of ellipse 110. For simultaneous bistatic and monostatic operation the return to each of the units 102, 104, monostatic as well as the bistatic, must arrive at the respective radar receiver in the interval between transmitted pulses. To meet this requirement, the pulse length and pulse repetition interval (PRI) must be adjusted for the target range band over which the radar is surveilling. Accordingly, a PRI is selected for each of the radar units 102, 104 with pulse length minimized within the selected PRI.

Beyond some maximum range that depends upon the distance between the two units 102, 104, the two units appear to the target as being located almost at the same point. Thus, beyond that maximum range, the bistatic target isolocus 110 is, essentially, circular and all three isoloci 106, 108, 110 are essentially coaxial. Otherwise, however, provided the target 112 is within range (i.e., at least closer than the maximum range) such that the isorange locus 110 for bistatic radar operation has a different shape than the isorange loci 106, 108, each target's error ellipse is different in each of the three. Three error ellipses for each particular target 112 intersect at different angles to each other at a single unique location. So, each target location can be determined to an accuracy, approximately, within the target's range position uncertainty of the sensors 102, 104.

It should be noted that for all coherent radar, including pulse doppler radar, a replica of the return signal must be amplified coherently. Then the replica is mixed coherently with the originally transmitted pulse. For monostatic radar, the transmitter pulse is available at the receiver which is located with the transmitter. However, for a bistatic radar the transmitter and receiver are at different, often distant locations. So, either a replica of the transmitted pulse must be provided to the receiver or it must be reconstructed at the receiving station. Optionally, the system processing the received bistatic mode signal may be located elsewhere, i.e., other than at the receiving location or the receiver unit. Methods of providing this transmitted pulse replica or reconstructed replica to a remotely located signal processor are known in the art.

Figure 4:
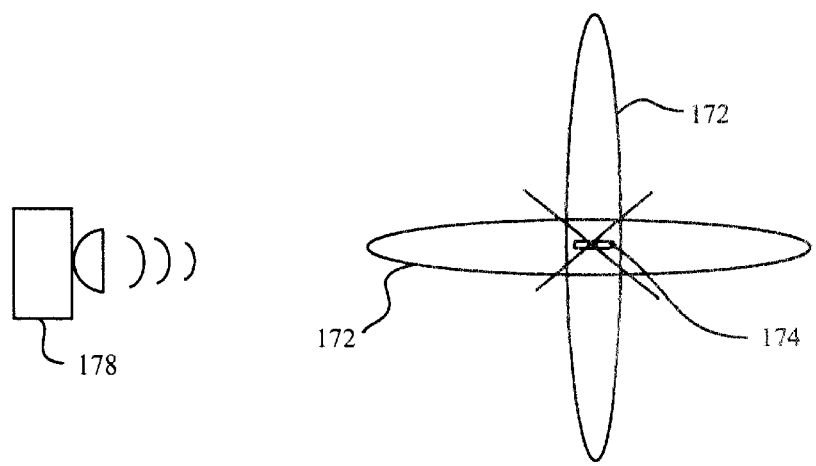
FIG. 4 shows an example of overlaying the error ellipses associated with the detection of a single ground target by two different radar sensors identifying the true location of a single ground target.

FIG. 4 shows an example in two dimensions of overlaying the error ellipses 170, 172 associated with the detection of a single ground target 174 by two different radar sensors 176, 178 to identify the true location of the target 174. In this example bistatic radar operation identifies a third error ellipse that is independent of these first two monostatic error ellipses. Further, provided the aspect angle falls within the above described acceptable range, this third error ellipse is oriented at a completely different direction than the first two.

Figure 5:
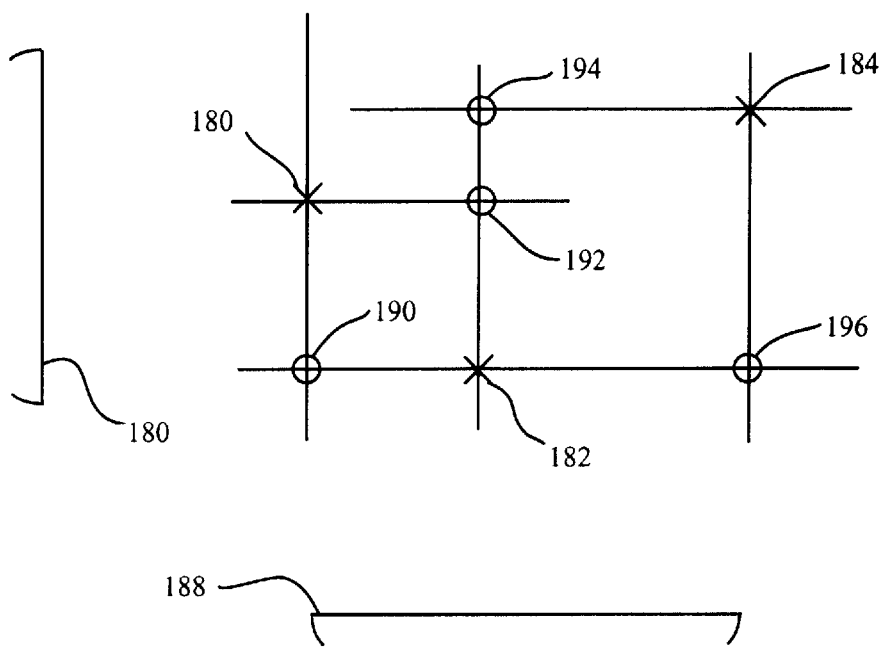
FIG. 5 shows an example of ghosts occurring from both units in monostatic operation.

FIG. 5 shows another example in two dimensions with multiple targets 180, 182, 184 in range of sensors 186, 188 wherein ghosts 190, 192, 194, 196 appear in both units 186, 188 in monostatic operation. Error ellipses for multiple adjoining monostatically detected targets 180, 182, 184 from sensor 186 overlap in multiple places with error ellipses from monostatic detections from sensor 188. Some of these overlaps correspond to the target positions 180, 182, 184 whereas other accidental overlaps cause ghosts 190, 192, 194, 196, that are identified and eliminated in the preferred embodiment system.

Preferably, each of the two radar units are operated simultaneously at offset operating frequencies to avoid mutual interference. With different operating frequencies each radar unit can be operated in monostatic mode without interfering with the other. Further, each radar unit can simultaneously receive and process reflected target/clutter energy from the other radar's transmission pulses. One unit includes additional receiver, tuned to the other radar's operating frequency, is required. Thus, the two units operate simultaneously in monostatic and bistatic modes. Accordingly, using the two radar units in combined monostatic/bistatic mode of operation eliminates target position ambiguities (ghosts) 190, 192, 196 that otherwise occurs when target density is high enough to cause those ambiguities and only the two monostatic measurements are combined.

Figure 6:
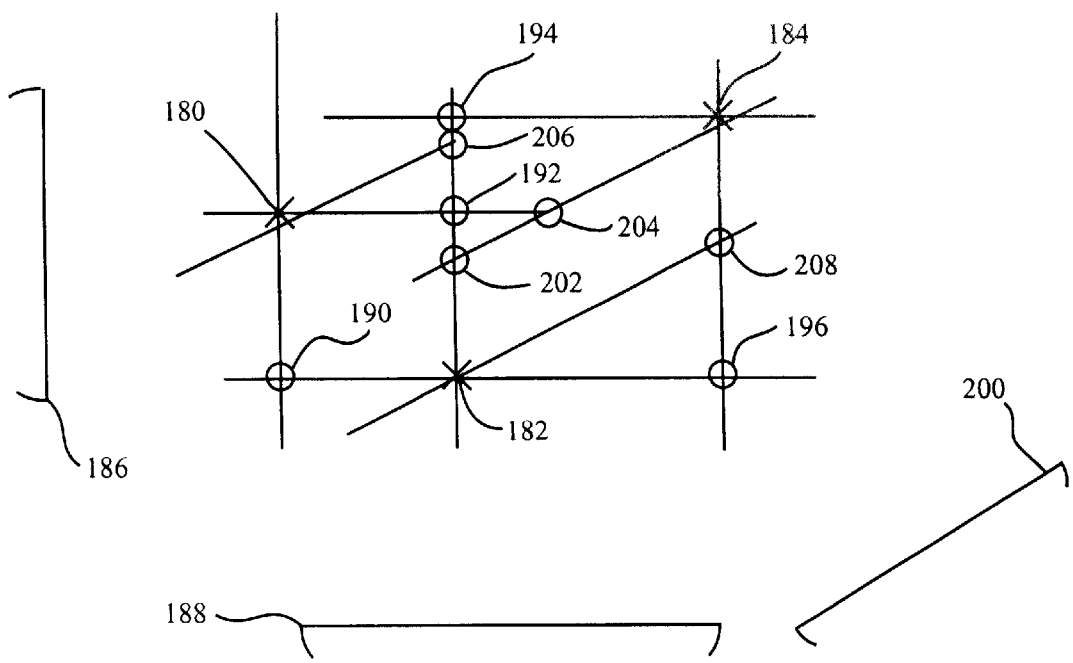
FIG. 6 shows the same targets of FIG. 3 viewed with an additional third radar unit.

FIG. 6 shows the same targets 180, 182, 184 in two dimensions of FIG. 5, wherein a third unit 200 is included. As can be seen, additional ghosts 202, 204, 206, 208 occur where the detection error ellipse from two different targets cross as a result of a third set of error ellipses from the third unit 200. However, detection error ellipses from all three sensors cross (i.e., 180, 182, 184) at real target positions. Thus, all of the ghosts can be identified and so. eliminated for this example. Most often, the error ellipses from all three sensors cross where the targets are actually present. Thus, using three individual monostatically operating radar units will, in most instances, solve the multilateration problem. However, this solution is considerably more difficult to implement because corresponding targets from three simultaneously operating monostatic radar units is not a simple task. Also, this solution costs at least half again as much to field three radar units rather than two.

Figure 7:
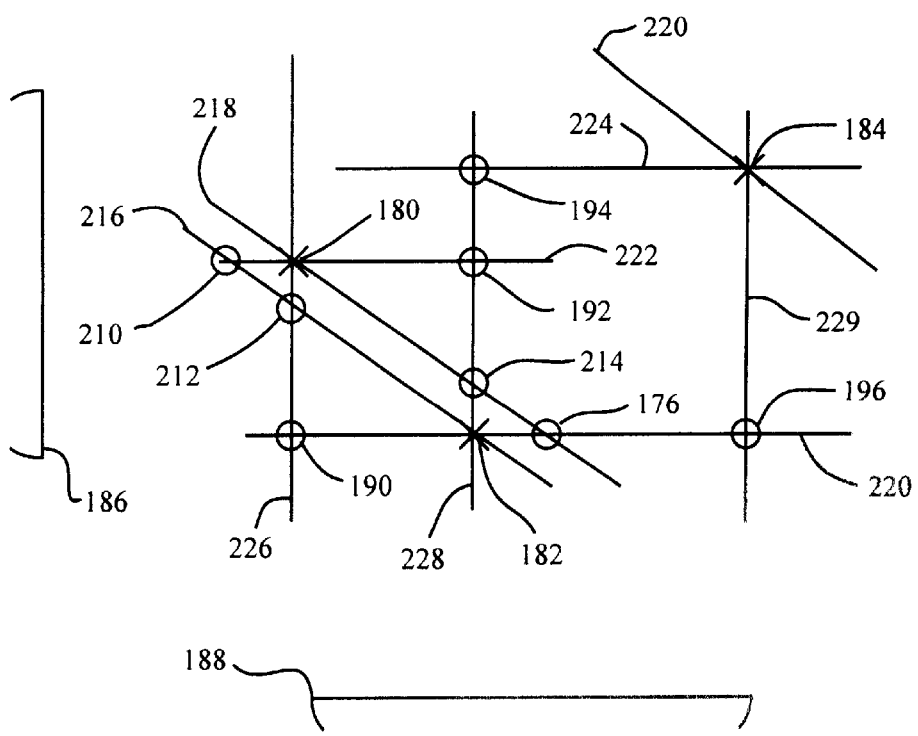
FIG. 7 shows an example of application of the present invention to the same targets as in FIGS. 5 and 6 on the same terrain.

FIG. 7 shows an example of application of the present invention to the same targets 180, 182 and 184 on the same terrain as in FIGS. 5 and 6. In this example, additional monostatic ghosts 210, 212, 214, 216 occur where detection error ellipses from targets 180, 182 intersect. However, all three of the detection error ellipses, from both monostatic modes and the bistatic mode, cross only at real target locations 180, 182 and 184. Thus, all of the ghosts can be identified and eliminated, at least as efficiently as if the third sensor 200 of FIG. 8 were included, but without the added expense.

Unless the target is very distant from the two radar sensors as compared to their distance from each other, the error ellipse associated with the bistatic direction 216, 218, 220, almost always lay at an angle with respect to the error ellipses corresponding to monostatic detections 220, 222, 224, 226, 228, 229 that is sufficiently large so that the ambiguous detections (ghosts) are easily resolved. However, it should be noted that the bistatic range of one unit (e.g., 186 to the target 182 and to the other unit 188) is identified to the reverse range 188 to 182 to 186. This second range yields a fourth error ellipse obtained by using the radar units in reverse, i.e., the receiver acting as the transmitter and vice versa. While this second bistatic mode of operation may be essentially the same as the first and so, provide no unique positional information, it may be used to further improve system signal to noise ratio, thereby, increasing the likelihood of target detection. Thus, including the third and, if desired, fourth error ellipse in combination with the two monostatic mode error ellipses eliminates ghosts from the results.

A second preferred embodiment of the invention has application where the targets are airborne, such as aircraft, spacecraft, or other vehicles that are not constrained to move on the ground. In this embodiment, referring again to FIG. 1, the volume that encompasses the locus of space with likely position of a detected object is an approximately-ellipsoidal region, with one axis, in the direction towards the sensor (the "range direction"), that is much smaller than the other two axes. It should be noted that the range-direction axis of this approximately-ellipsoidal locus is, typically, so small compared to the other two axes, that it has a shape similar to that of a phonograph record or, even a piece of paper.

Figure 8:
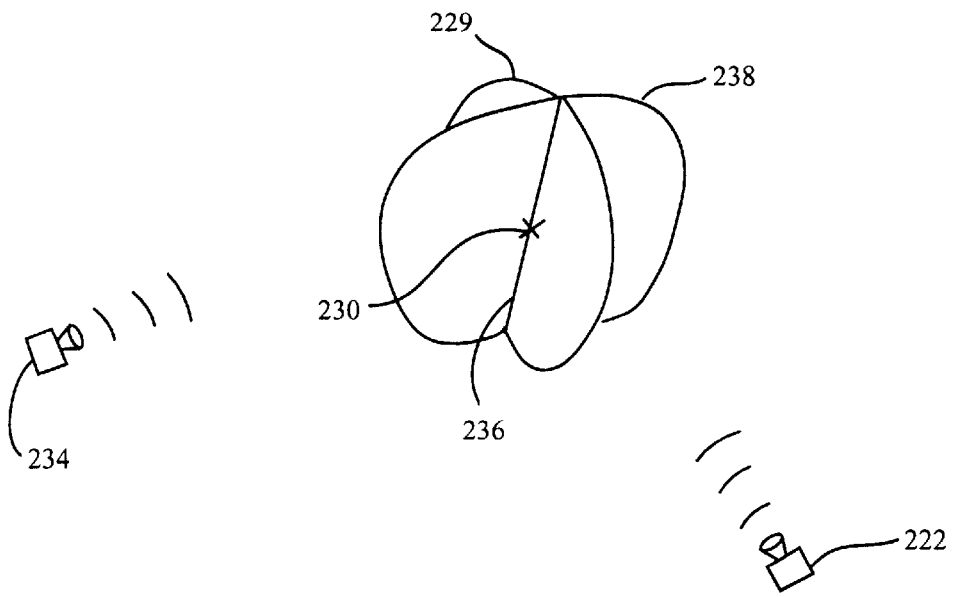
FIG. 8 is an example of application of target detection, location and tracking using two radar sensors (bilateration) for a single target in three dimensions, such as to aircraft or spacecraft that are not constrained to move on the ground.

FIG. 8 is an example of application of this second embodiment to target detection, location and tracking using two radar sensors 230, 234 (bilateration) for a single target 232 in three dimensions, such as to aircraft or spacecraft that are not constrained to move on the ground. For airborne targets, bilateration of two simultaneous measurements from two radar sensors 230, 232 produces a combined error locus 236 that is the intersection of the two individual location estimate loci 238, 239, essentially a line 236 or, is more or less tube shaped. The target position, marked "X", must lie somewhere in this tube 236, such that bilateration greatly reduces the error in one direction, e.g., when the error locus 236 is compared to either individual loci 238, 239, but does not greatly reduce the error along the intersection. Nonetheless, this improvement in positional knowledge very often is quite valuable.

For example, for ground-based air traffic control radars that surveil nearly horizontally, the intersection line 236 yields very accurate longitude and latitude positions for detected aircraft but still provides relatively poor information about the aircraft's altitude. However, air traffic control has aircraft altitude information available by other means. Normally, each aircraft measures its own altitude barometrically or by on-board radar altimetry. This altitude measurement is transmitted to the air traffic control radar receiver using a transponder.

Figure 9:
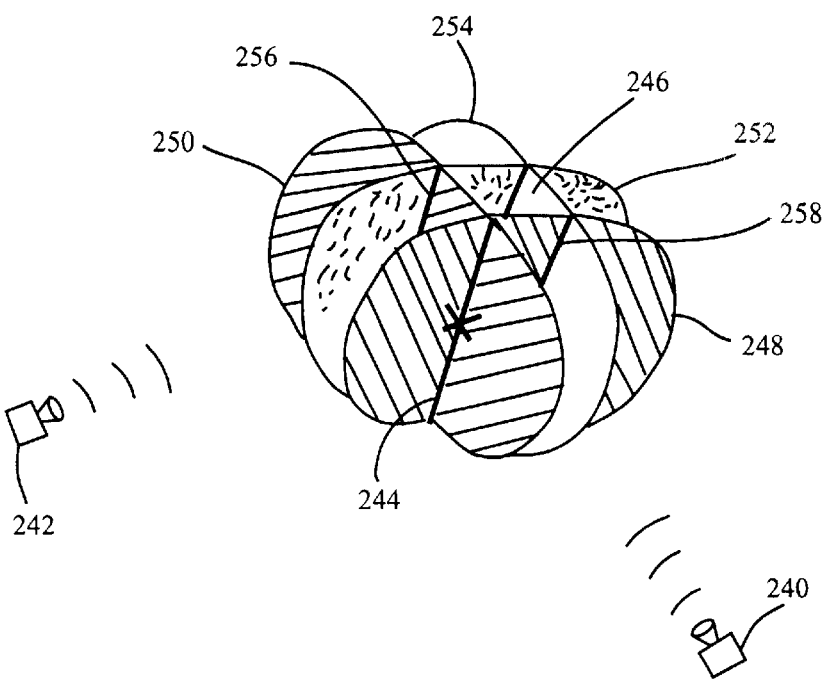
FIG. 9 is an example bilateration for multiple adjacent targets (two in this example) in three dimensions.

FIG. 9 is an example of application of bilateration to multiple adjacent targets (two in this example) in three dimensions. Due to the difficulty of drawing complex relationships in three dimensions, this example illustrates only two targets and two ghosts resulting therefrom. In this example, the two radar sensors 240, 242 simultaneously illuminate two targets, one of these two targets, marked with "X" is in the forefront on the intersection locus labeled 244. The position of the other target is hidden in this figure and lies on the intersection locus labeled 246.

The bilateration intersection of the error locus 248 from sensor 240 and error locus 250 from sensor 242 yields intersection locus 244. Similarly, error locus 252 from sensor 240 and 254 from sensor 242 yields the intersection locus 246 at the other, hidden target. However, ghosts (also not shown) occur at intersection loci 256, 258 because the two targets are closer to each other than the major axis of the error loci 248, 250, 252, 254 which, therefore, intersect in two additional intersection loci 260, 262. As in two-dimensional bilateration, distinguishing the ghosts 256, 258 from the actual target loci 244, 246 is not easy. Although the bilateration result is a great improvement over the individual radar unit result from either sensor by itself it remains difficult or impossible to ascertain whether targets lie within the loci 244 and 246 or 256 and 258 or in all four from the sole combination of the two monostatic measurements.

Figure 10:
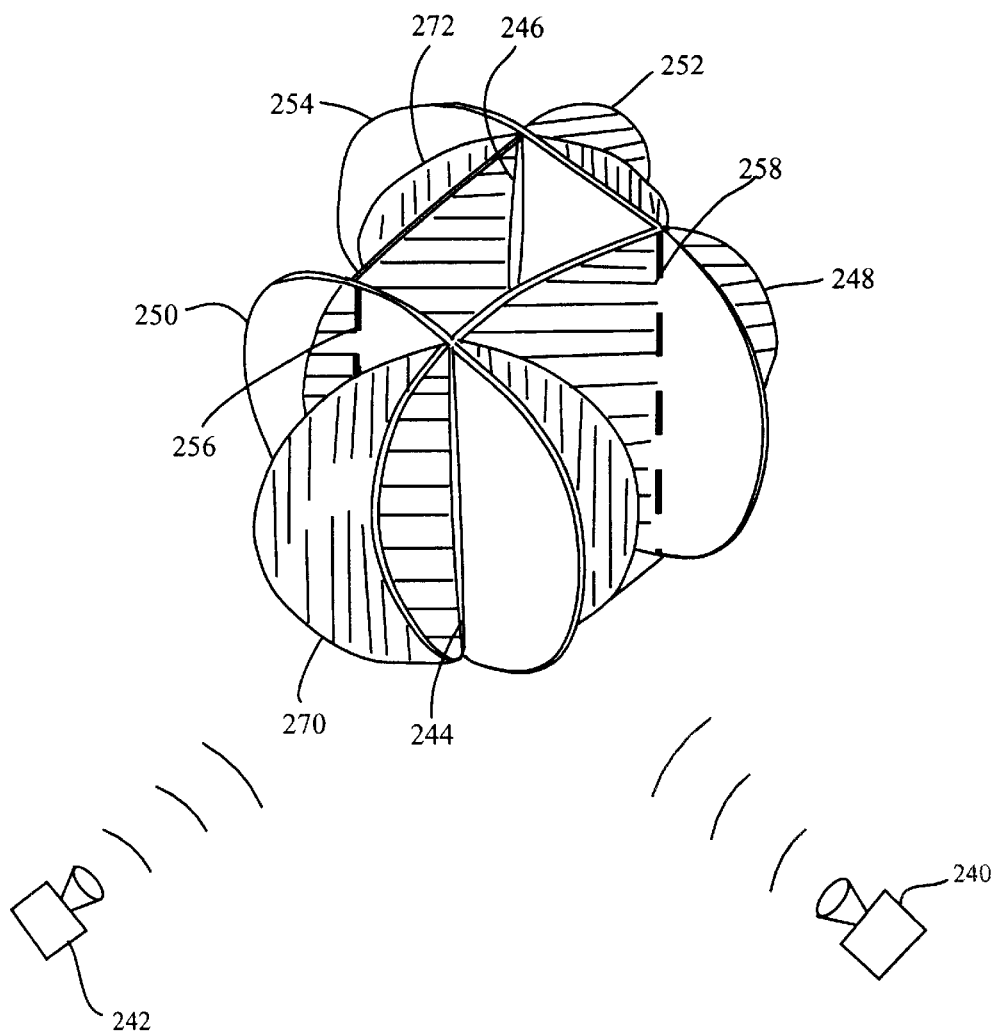
FIG. 10 shows application of a second preferred embodiment of the invention to airborne targets such as aircraft, spacecraft, or other vehicles that are not constrained to move on the ground.

FIG. 10 shows a second preferred embodiment of the invention as shown in three-dimensions and applied to the situation of FIG. 9 with identical elements labeled identically. The second preferred embodiment has application to airborne targets such as aircraft, spacecraft, or other vehicles that are not constrained to move on the ground. Additional bistatic measurement information is combined with monostatic measurements from each of the radar sensors 240, 242 to resolve the ambiguities or ghosts that crop up even with bilateration in the presence of multiple adjacent targets. In this example, the first radar sensor 240 detects the two targets with the error loci 248, 252. The second radar sensor 242 also detects two targets with error loci 250, 254. The bilateration of these two sets of measurements produces four loci 248, 250, 252, 254 that contain both targets. The bistatic measurements from each unit 240, 242 creates a third pair of error loci 270, 272, respectively, that resolve the ambiguity, because each locus 270, 272 intersects only 244 and 246, respectively.

It should be noted that the combined mode radar system of the present invention is especially suited for use as a space based radar system. In particular, the present invention may be seamlessly implemented in a system currently being developed for medium earth orbit (MEO) and referred to as the Large Aperture Multi-mission MEO Project (LAMP) system. The LAMP system includes a constellation of radar satellites that have continuous or near continuous one satellite global access and, that also exhibits a large degree of dual satellite access (greater than 70% globally). Thus, the present invention is ideally suited for the LAMP system, such that a moving target may be tracked by changing pairs of radar satellites, i.e., when the target is out of range of one of the pair, another is substituted to form a new pair. Thus, adapting the LAMP system in accordance with the present invention would yield a significant increase in performance at these dual access locations, thereby maximizing system utility and achieving a very high benefit to cost ratio in these areas.

Advantageously, the present invention provides a low cost accurate radar system that is especially applicable to any area where two radar platforms are within range of each other. This advantage is realized regardless of whether the platforms are two airborne platforms, two spaceborne platforms, or one spaceborne platform and an airborne platform. In particular, for space based radar, such as the LAMP constellation of radar satellites, the present invention can use continuous or near continuous dual radar global access for locating and tracking targets at most latitudes. Stereo or a multi-lateral use of satellites improves locational information without requiring any increase in constellation size or requiring additional airborne or spaceborne assets.

While the invention has been described in terms of preferred embodiments, those skilled in the art will recognize that the invention can be practiced with modification within the spirit and scope of the appended claims.

What is claimed is:

1. A pulse doppler radar system comprising:
    a first radar unit operating monostatically transmitting a first radio frequency (RF) energy signal and receiving a first RF return from said transmitted first RF energy signal;
    a second radar unit operating monostatically transmitting a second RF energy signal and receiving a second RF return from said second RF energy signal; and
    said second radar receiver receiving a bistatic return from said first RF energy signal, information from said bistatic return being combined with information from monostatic returns from each of said first radar unit and said second radar unit, said combined information providing individual target information.

2. A pulse doppler radar as in claim 1 wherein RF energy returns arrive at said first radar unit and said second radar unit between RF signal transmissions.

3. A pulse doppler radar as in claim 1 wherein, each of the first radar unit and second radar unit are land based radar units.

4. A pulse doppler radar as in claim 1 wherein, each of the first radar unit and second radar unit are airborne based radar units.

5. A pulse doppler radar system as in claim 1 wherein, each of the first radar unit and second radar unit are space-based radar units.

6. A pulse doppler radar system as in claim 5 further comprising:
    a plurality of space-based radar units, ones of said plurality of space based radar units being selectively paired as said first radar unit and said second radar unit whenever a target is determined to be within a maximum range of a selected said pair, said pair simultaneously operating monostatically and cooperating bistatically to track said target.

7. A pulse doppler radar system as in claim 1 further comprising:
    said first radar receiver receiving a second bistatic return from said second RF energy signal, information from said second bistatic return being combined with the first said bistatic return and said information from monostatic returns, said combined information providing individual target location.

8. A method of operating a radar system to track a target, said method comprising the steps of:
    transmitting a first radar signal from a first radar unit;
    transmitting a second radar signal from a second radar unit;
    receiving a monostatic radar return at said first radar unit from said first signal;
    receiving a monostatic radar return at said second radar unit from said second radar signal;

receiving a bistatic return at said second radar unit from said first radar signal from said first radar unit; and comparing monostatic radar returns with said bistatic radar return to identify target location.

9. A method as in claim 8, wherein said first radar signal is at a first radio frequency and said second radar signal is at a second radio frequency, said bistatic return being at said first radio frequency.

10. A method as in claim 8, wherein when said target moves out of range of said first radar unit, a third radar unit is substituted for said first radar unit.

11. A method as in claim 8, wherein when said target moves out of range of said second radar unit, a third radar unit is substituted for said second radar unit.

* * * * *